Feb. 21, 1961 L. B. ROSSEAU 2,972,651
ELECTRODE ARRANGEMENT IN A SALT BATH FURNACE
Filed April 13, 1956 3 Sheets-Sheet 1
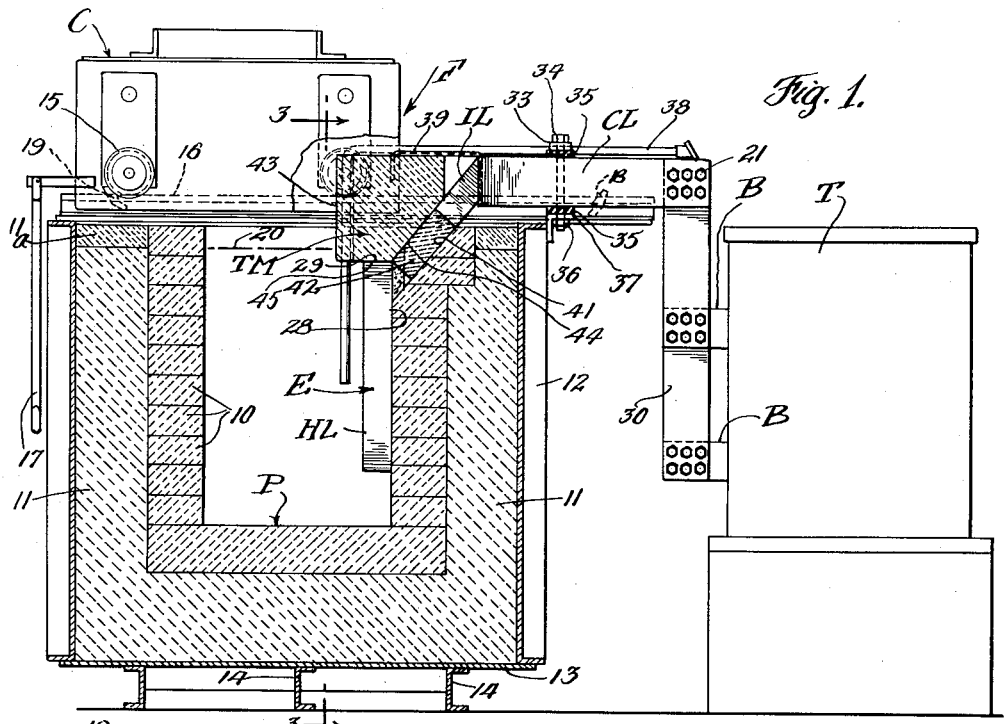
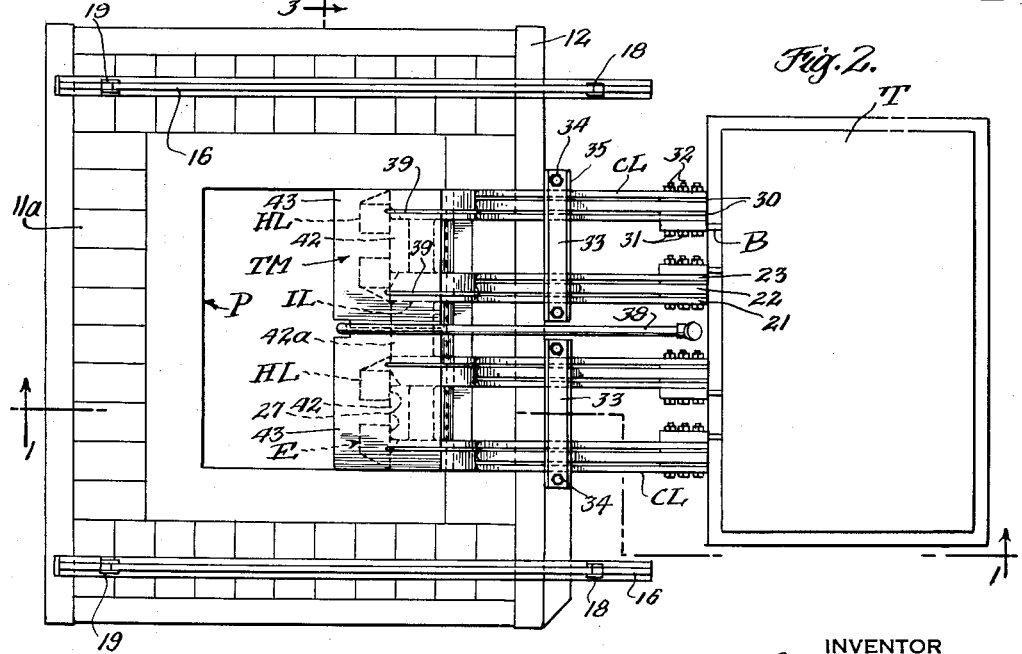
INVENTOR
Leon B. Rosseau
BY
Synnestvedt & Lechner
ATTORNEYS Feb. 21, 1961 L. B. ROSSEAU 2,972,651
ELECTRODE ARRANGEMENT IN A SALT BATH FURNACE
Filed April 13, 1956 3 Sheets-Sheet 2
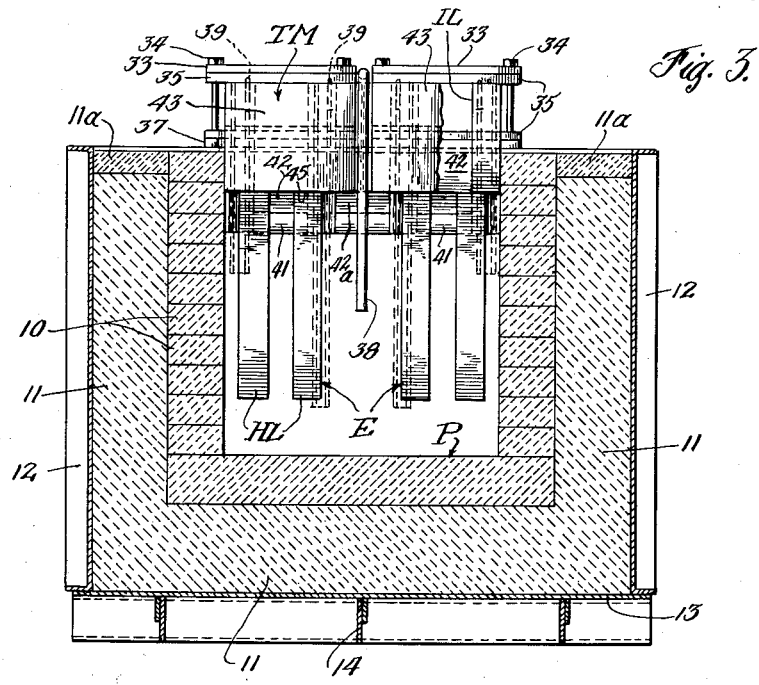
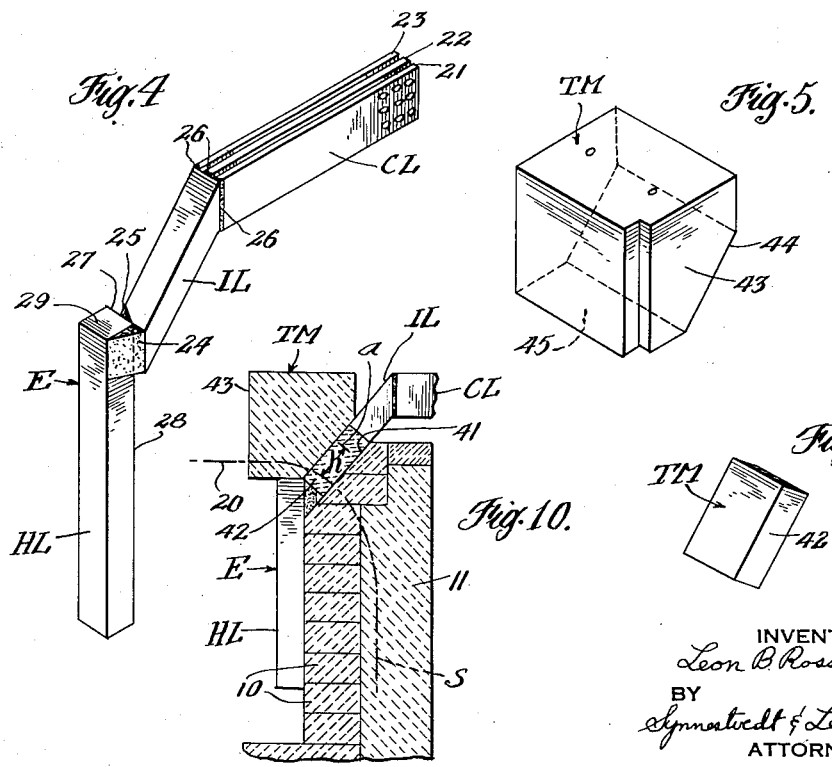
INVENTOR
Leon B. Rosseau
BY
Synnestvedt & Lechner
ATTORNEYS INVENTOR
Leon B. Rosseau
BY
Lynnestvedt & Lechner
ATTORNEYS

2,972,651

ELECTRODE ARRANGEMENT IN A SALT BATH FURNACE

Leon B. Rosseau, Narbeth, Pa., assignor to Ajax Electric Company, Philadelphia, Pa., a corporation of Pennsylvania Filed Apr. 13, 1956, Ser. No. 577,980

14 Claims. (Cl. 13—23)

This invention relates to electric salt bath furnaces and, more particularly, to an electrode and furnace wall construction facilitating the removal and replacement of the electrodes of an electric furnace.

Electric salt bath furnaces of the general kind here involved are commonly used for numerous heat-treating purposes. They ordinarily employ a pot, preferably built up of blocks of ceramic material, enclosed within a suitable structural and insulating housing and associated with at least one pair of metallic electrodes connected to a source of electric power used in maintaining the bath of liquid salt within the pot at the desired temperature. Each of the electrodes has a "hot leg" substantially immersed in the salt bath and a "cold leg" extending out of the bath for connection to the power source.

Heretofore, one of two general types of electric furnace has been employed for most purposes. One type involves the use of electrodes extending upwardly out of the bath and over the top of the furnace wall, and the second type involves submerged electrodes extending outwardly through the wall of the furnace below the level of the salt bath.

Electrodes extending over the top of the furnace wall have the advantage that they are readily removable and replaceable but, on the other hand, they have the disadvantage that the electrode material at the point of emergence from the bath is subject to the corrosive tendencies of the hot salt in conjunction with the atmosphere. The corrosion difficulties can be lessened somewhat by the use of special corrosion-resistant alloys, usually involving nickel as an alloying element, which lengthen the life of the electrode in service.

However, corrosion problems are not entirely overcome by the special alloy electrodes and, in any case, such electrodes are relatively costly and necessitate the use of alloying materials sometimes in short supply, for instance, during war emergencies.

The second of the two general types of electrode mentioned above, namely, the submerged electrode extending outwardly through the furnace wall, has the advantage that corrosion is lessened even without the use of special alloys by substantially excluding air from contact with the electrode at the bath surface. This type has the disadvantage that considerable production time is lost when it is necessary to replace electrodes.

The submerged electrode arrangement involves legs which extend through and are built into the furnace wall. During use the molten salt permeates the blocks of ceramic material and, upon cooling, the salt acts like a cement to weld the ceramic blocks and electrodes into a unitary structure. Since the bath must always be cooled before commencing work on the replacement of the submerged type of electrode, such a replacement operation necessitates a breaking up of at least a portion of the pot wall in order to free the electrodes. After new electrodes are inserted, it is necessary to rebuild the pot wall with blocks and mortar. The mortar must be permitted to dry before proceeding to the next step in the process of putting the furnace back in shape for normal production.

After the mortar has dried, still more production time is lost in remelting the bath and "resoaking" the wall. "Resoaking" involves holding the bath above the melting point for a period of time on the order of several days to permit the salt to permeate the new blocks and seal all crevices and leaks.

The above procedure for replacing submerged electrodes necessitates a prolonged shutdown of furnace production which may, in applications where the salt bath is integrated into an assembly line, seriously inconvenience the production of a whole plant.

The invention herein has the main advantages of both of the electrode types discussed above without, however, the disadvantages.

The primary object of the invention is the provision of an electric salt bath furnace capable of sustained operation at high temperatures for relatively long periods of time without shutdown for repair or replacement of the electrodes.

Further, the invention has as an object the provision of an electric furnace having readily removable electrodes and, at the same time, having means for minimizing electrode corrosion by substantially excluding contact of air with the electrodes at the bath surface. A still further object of the invention being to provide, in a construction of the kind just mentioned, electrodes and associated parts which are removable and replaceable while the salt bath in the furnace remains in molten condition.

Other objects and advantages of the invention will be clear from the following description taken together with the accompanying drawings in which;

Figure 1 is a vertical sectional view of one embodiment of the invention taken on the line 1—1 of Figure 2;

Figure 2 is a plan view of the furnace shown in Figure 1;

Figure 3 is a vertical sectional view taken along the line 3—3 of Figure 1;

Figure 4 is a perspective view of an electrode on an enlarged scale as compared with Figure 1;

Figure 5 is a perspective view of one of the tiles used with the electrode of Figure 4;

Figure 6 is a perspective view of another tile used with the electrode of Figure 4;

Figure 10 is a fragmentary vertical sectional view, similar to Figure 1, showing the region of salt penetration of the tile means and wall.

Figure 7:
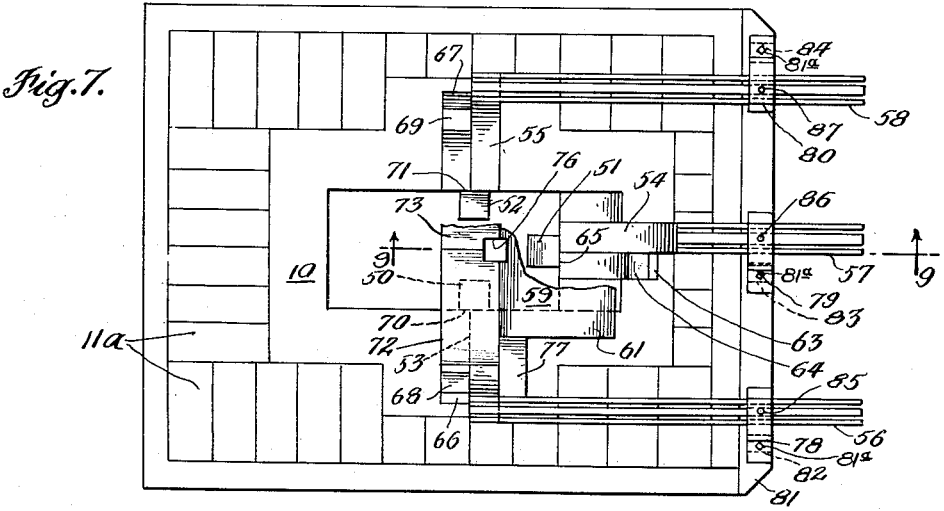
Figure 7 is a plan view partly broken away of another embodiment of the invention utilizing three electrodes.

Referring to Figure 1, the furnace F comprises a pot P, a cover C, tile means TM, and a plurality of electrodes E each of which includes a hot leg HL, cold leg CL and a portion IL intermediate the hot and cold legs. The cold legs CL are connected with bus bars B of a source of electric current, such as transformer T.

Referring to the drawings in more detail, and turning first to Figure 1, the upwardly open pot P is preferably built up of a plurality of ceramic bricks 10 and is surrounded on the sides and bottom by insulation 11 topped by a course of protective fire brick 11a, the whole assembly being held in place by structural members 12 and 13, resting on support members 14. Cover C is mounted on rollers 15 adapted to ride on tracks 16 associated with the top surface of the pot wall. The cover can roll (in response to urging by means of the pivoted handle 17) backward in the direction of the transformer T as far as the stops 18 in order to uncover the pot and forward over the pot as far as the stops 19.

As best seen in Figure 4, the electrode hot leg HL is advantageously generally vertically arranged and adapted to be positioned in the pot adjacent a wall and below the normal level 20 (see Fig. 1) of the salt bath. The cold leg CL is composed of three leaves or laminations 21, 22 and 23 which are mounted in parallel spaced relation, the assembly being adapted to be positioned above and extend outwardly beyond the furnace wall.

The intermediate portion IL interconnects the hot leg HL and the cold leg CL and slopes outwardly and upwardly from the upper end of the hot leg to the inner end of the cold leg. As shown in the drawings, the intermediate portion is formed as a separate piece from the hot leg and the cold leg (see Figure 4) and is adapted to be secured to the hot leg by means of welds 24 and 25 and to the cold leg by means of welds 26.

The hot leg is offset from the associated intermediate portion toward the hot leg of the other electrode. This offset is of importance in ensuring that current will flow only through the liquid salt between the hot legs and not between the intermediate portions, this effect resulting from the fact that the path for current flow is shorter between the hot legs than between the intermediate portions. In addition, the offsets are important because they provide tile means supporting shoulders 27 described more fully herebelow. The intermediate portion IL preferably connects with vertical surface 28 of the hot leg so that the upper end surface 29 may be horizontally disposed to provide a tile means supporting surface, also more fully described herebelow.

As seen in Figures 1 and 2, the leaves 21, 22 and 23 of the electrode cold leg interleave with vertical leaves 30 connected to the bus bars B. Bolts 31 and nuts 32 are conveniently employed to ensure tight contact between the cold leg leaves and the vertical leaves 30, similar suitable connector elements being utilized to secure the vertical leaves 30 to the bus bars B.

The electrodes are mounted in pairs (the furnace of Figures 1 to 3 utilizing two pairs) and are clamped in position by means of straps 33, bolts 34, insulating members 35 and nuts 36, all cooperating with angle irons 37 secured to the structural members 12 of the furnace wall.

It is here noted that (as best seen in Fig. 3) for each pair of electrodes, the strap 33, bolts 34, and angle irons 37 form a magnetic loop around the cold legs. With this arrangement, the flux induced in the loop by the flow of current in the two electrodes will be zero.

A thermocouple 38 extends from the region of the cold legs down into the molten salt to measure the bath temperature.

The top of the furnace wall is chamfered or sloped as at 41 to conform to the bottom surface of the intermediate portion of each electrode. The slope must be selected so that the salt bath (rising in the pot to level 20) will not flow out over the top of the furnace wall and yet so that the entire hot leg of each electrode is submerged. It is thus provided that the intermediate portion of the electrode emerges from the salt bath while the hot leg is entirely submerged and the cold leg is entirely above the molten salt. The place of maximum corrosion in an electrode is generally the point of emergence from the bath, since at that point the metal of the electrode is subjected to elevated temperatures, hot salt, and air. As brought out more fully below, the invention provides for a minimization of the air contacting the electrode at the point of emergence from the salt bath and thus greatly reduces the problem of corrosion at the bath surface.

Tile means TM cooperate with the pot wall to closely surround the intermediate portion at the point of emergence from the bath. The above discussed arrangement of the surface 41 of the furnace wall provides for surface contact between the furnace wall and the underside of the electrode, while (as best seen in Figures 5 and 6), tile means TM includes a tile 42 adapted to fit between the electrodes against the surface 41 and a tile 43 adapted to overlie a pair of electrodes and a tile 42. For this purpose tile 43 includes a sloping or chamfered surface 44 making surface contact with the upper sides of the intermediate portions.

The tile 42 is prevented from sliding down the inclined surface 41 by abutment against the shoulder 27 (see Figure 4) while the bottom surface 45 of the tile 43 rests against the upper end surface 29 of the hot leg. Also holding the tiles in place are the tie rods 39, each of which is U-shaped with one leg hooked into the space between leaves of the cold leg and one leg hooked into a suitable hole in the tile.

The tile means 42a between the two pairs of electrodes may be prevented from sliding downwardly by being cemented to the sloping surface of the pot wall. Alternatively, tile means 42a may be an integral part of the wall.

It is here mentioned that, although the drawings illustrate tile means 42 formed as pieces separate from the pot wall, it is possible in certain applications to provide tile means in the form of an integral piece of the pot wall protruding up between the electrodes. It is preferred to utilize a separate piece such as 42 because experience has shown that, even if the liquid salt has resulted in some bonding action between the parts, it is easier to dislodge the electrodes during replacement.

The tile means and furnace wall in effect provide two passages the walls of which closely surround the intermediate portions so as to impede ingress and egress of air and inhibit corrosion.

Attention is called to Fig. 10 of the drawings which is similar to a portion of Fig. 1. Preliminarily it is pointed out that electrode corrosion varies with the temperature of the electrode. Thus, at relatively low temperatures corrosion is not a significant problem. On the other hand, at relatively elevated temperatures, corrosion becomes an increasingly more severe problem.

As shown in Fig. 10, the pot is filled with molten salt to level 20 but, contrary to what might be expected, level 20 does not continue horizontally directly over to the furnace wall. The electrode cold leg and intermediate leg conduct heat away from the region of the bath and dissipate it in the air surrounding the furnace. At the same time, the tile means 42 and 43, together with the furnace wall, act as heat insulators and tend to retard the flow of heat from the bath to the region of the lower end of the intermediate leg. As a result, the salt actually penetrates approximately to the region of the line S. Attention is called to the fact that the salt actually permeates all the way through the tiles 10 and even a portion of the insulation 11 therebeyond.

Electrode corrosion is not a serious problem within the zone bounded by the lines 20 and S because of the fact that virtually no air comes in contact with the hot electrodes. Beyond the line S there is a relatively short length of the intermediate electrode indicated by the letter $h$ and the associated arrows which is at a sufficiently elevated temperature so that corrosion is a potential problem. Above the portion $h$ the temperature of the electrode is low enough so that corrosion is not potentially significant. By way of illustration it is here mentioned that, when the salt bath is at a temperature of about 1550° F., the electrode temperature at the region of line S may be of the order of 1350° F. and the temperature at line $a$, that is at the upper end of portion $h$, may be approximately 1100° F.

It is thus seen that from a corrosion standpoint the most critical portion of the intermediate leg of the electrode is the portion $h$ just above the actual level of the hot salt. The entire portion $h$ (plus a small additional portion on either side) is completely and closely surrounded on all four sides by tile means.

During the initial start-up of a furnace according to the invention, the outside layers of the electrode in the portion h will oxidize and form a scale. Such scale will have a volume several times that of the original unoxidized metal and will thus completely fill the small air spaces between the tile means and the portion h and virtually prevent ingress of additional air and oxidation of electrode metal below the outermost oxidized layer. The initial corrosion of the surface or skin of portion h in effect seals off the electrode from any significant further contact with air and thus virtually eliminates further corrosion.

Although Figs. 1 to 3 show a furnace construction utilizing two pairs of electrodes, it is possible and desirable in some applications to utilize only a single pair. However, the multiple pair arrangement is preferred because it is then possible to ensure the maintenance of sufficient heat in the bath to prevent solidification of the salt during a change of electrodes. This can be done by shutting off the supply of power only to the pair being replaced while continuing the supply to the other pair or pairs.

When only one pair of electrodes is used in a furnace, it is preferable to bail out the molten salt before removing the electrodes. Even though the bath would not cool to the solidification point during the relatively short period of time normally required to replace the electrodes of the invention, it is safer to remove the salt because of the fact that any unforeseen delay in the replacement procedure could result in solidification of the salt while the electrodes were out of place. Such solidification would cause more inconvenience and delay than that occasioned by the extra step of removing the salt.

Figures 8, 9:
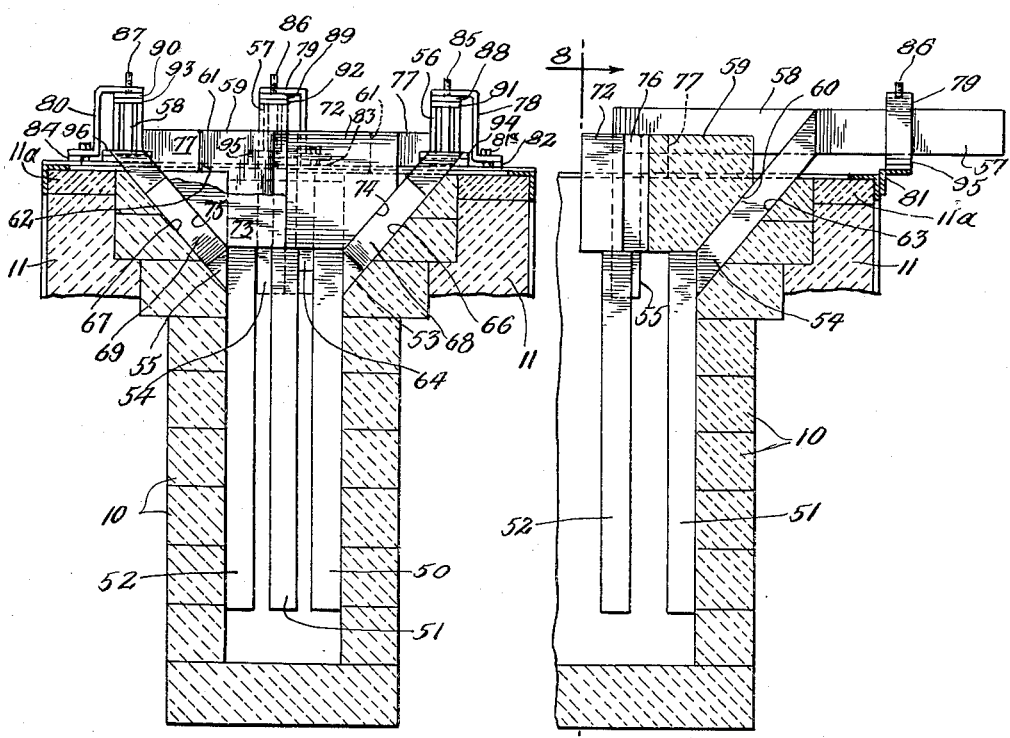
Figure 8 is a vertical setcional view partly broken away of the embodiment of Figure 7 taken along the line 8—8 of Figure 9.
Figure 9 is a vertical sectional view of the embodiment of Figure 7 taken along the line 9—9 of Figure 7.

Figure 7, 8 and 9 of the drawings illustrate a three-electrode arrangement especially adapted for use with three-phase current. The three electrode hot legs 50, 51 and 52 are respectively connected with the intermediate portions 53, 54 and 55 which are in turn connected with the laminated cold legs 56, 57 and 58 respectively. It is noted that, instead of having each electrode cold leg extend outwardly over the furnace wall in a direction generally in line with the intermediate portion, the cold legs 56 and 58 are extended in direction generally parallel to cold leg 57 so that the free ends of the three cold legs can most conveniently be connected with a source of power (not shown) in a manner similar to that illustrated in Figs. 1 and 2.

As in the embodiment shown in Figs. 1 to 3, the furnace includes insulation 11 protected at the top by fire bricks 11a, and tiles 10 forming the furnace pot.

The arrangement of the tile means in the embodiment shown in Figs. 7 to 9 is somewhat different from that of the tile means shown in the embodiment of Figs. 1 to 3. Thus a tile 59 having a slanting lower surface 60 and a pair of horizontal extensions or flanges 61 is adapted to generally overlie intermediate portion 54 and rest against the top end surface of hot leg 51. The extensions 61 overlie and rest on the top edge of the furnace wall as at 62 (see Fig. 8).

As shown in Figs. 7 and 9, the top inner edge of the furnace wall is chamfered or sloped as at 63 to cooperate with the sloping underside of the intermediate portion 54. The chamfered portion 63 is wide enough to accommodate not only the intermediate portion 54, but also the small tile 64 which is prevented from sliding down the inclined surface 63 by abutment against the shoulder 65 provided by the lateral offsetting of the hot leg 51 from a position in line with the intermediate portion 54.

In a manner similar to that just described with reference to the middle electrode, the pot wall has chamfered surfaces 66 and 67 associated with the intermediate portions 53 and 55 respectively, the chamfered portions 66 and 67 being of sufficient width to accommodate the small tiles 68 and 69. The hot legs 50 and 52 are laterally offset from a position in line with their associated intermediate portions in order to provide shoulders 70 and 71 against which the blocks 68 and 69 rest.

Tiles 72 and 73 have sloping bottom surfaces 74 and 75 which cooperate with intermediate portions 53 and 55 respectively. Tiles 72 and 73 rest on the top end faces of hot legs 50 and 52 and also abut against each other and against tile 59. As best seen in Fig. 7, tiles 59, 72 and 73 are cut out to form the passage 76 through which a thermocouple (not shown) may extend into the bath.

Small auxiliary tiles 77 are provided to fit snugly between the flanges 61 of block 59 and the cold legs 56 and 58. The blocks 77 are wedged between block 59 and the two outer electrodes in order to overcome the tendency for the outer two electrodes to fall toward each other.

Instead of the continuous magnetic loop provided by the strap 33 and bolts 34 discussed above in connection with the embodiment of Figs. 1 to 3, the embodiment of Figs. 7 to 9 utilizes three separate means for holding the three electrodes in place, each of the three holding means being arranged to avoid a complete magnetic loop. Thus short straps 78, 79 and 80 are fixed at the lower end to frame member 81 by bolts 81a. Small pads 82, 83 and 84 provide for a rocking motion of the straps as the bolts are tightened. The straps 78, 79 and 80 are bent to extend up beside and over the top of cold legs 56, 57 and 58 respectively and set screws 85, 86 and 87 may be provided which cooperate with threaded holes in the three straps so that clamping pressure supplemental to that provided by the bolts 81a can be exerted against the steel plates 88, 89 and 90, the upper insulating plates 91, 92 and 93, the cold legs 56, 57 and 58, and the lower insulating plates 94, 95 and 96.

With the arrangement of Figs. 7 to 9, removal and replacement of the electrodes can be accomplished in a manner generally similar to that described above in connection with the electrode arrangement of Figs. 1 to 3. Since three electrodes are present, it is advantageous to apply single-phase current to any two of the electrodes in order to insure the maintenance of the bath in molten condition while the third electrode is replaced. Next, the new electrode and one of the old electrodes can be connected to the source of single-phase current so that another of the old electrodes may be replaced. Finally current is applied across the two new electrodes and the third old electrode is replaced.

As with the arrangement of Figs. 1 to 3, during the removal operations just described the upper tiles are lifted out of place, the small tiles beside the cold legs are removed and finally the electrodes may be lifted out of the furnace, the whole operation being especially quickly and efficiently carried out because of the fact that the tile means which must be lifted in order to remove the electrodes are not cemented in place. Instead they are separately formed, set in place, and retained in place by abutment against various described shoulders.

Attention is called to yet another advantage of the invention, namely the arrangement of the removal blocks so as to extend only a minimum distance upwardly and thus make possible the use of covers (such as that shown in Fig. 1) mounted on rollers, which covers can easily be rolled back into a position generally overlying the removable tiles and rolled forward into a position generally overlying the furnace pot.

Various features of the cold leg CL (especially the laminations 21, 22 and 23 and the manner of their connection to the bus bar B) are more fully disclosed and claimed in my copending application No. 578,068, filed April 13, 1956, now Patent No. 2,826,623 and assigned to the assignee of the present application.

I claim:

1. In an electric salt bath furnace, an upwardly open pot, a removable electrode comprising, a generally vertical hot leg positioned in the pot adjacent a wall and below the normal level of the salt bath, a generally horizontal cold leg positioned above and extending outwardly beyond the furnace wall and, interconnecting said hot leg and cold leg, an intermediate portion sloping outwardly and upwardly from the upper end of the hot leg to the inner end of the cold leg, the inside upper edge of the pot wall being chamfered to conform to the bottom surface of the intermediate portion of the electrode, and removable block means adapted to cooperate with the chamfer surface to closely surround the intermediate portion.

2. In an electric salt bath furnace, an upwardly open pot, a plurality of removable electrodes each comprising, a generally vertical hot leg positioned in the pot adjacent a wall and below the normal level of the salt bath, a generally horizontal cold leg positioned above and extending outwardly beyond the furnace wall, and an intermediate portion interconnecting said hot leg and cold leg and sloping outwardly and upwardly from the upper end of the hot leg to the inner end of the cold leg, the pot wall being constructed and arranged to accommodate the underside of the intermediate portion of each electrode, and tile means associated and cooperating with the pot wall to closely surround the intermediate portion of each electrode at the point where it emerges from the salt bath whereby to minimize contact of air with the electrode at the bath surface.

3. A construction according to claim 2 in which the tile means and electrodes are removable from the furnace in an upwardly direction.

4. In an electric salt bath furnace, an upwardly open pot, a pair of removable electrodes mounted in parallel spaced relation, each electrode comprising, a generally vertical hot leg positioned in the pot adjacent a wall and below the normal level of the salt bath, a generally horizontal cold leg positioned above and extending outwardly beyond the furnace wall, and an intermediate portion interconnecting said hot leg and cold leg and sloping outwardly and upwardly from the upper end of the hot leg to the inner end of the cold leg, the pot wall being chamfered to conform to the bottom surface of the intermediate portion of each electrode, and tile means cooperating with the chamfer surface of the pot wall to closely surround the intermediate portion of each electrode at the point where it emerges from the salt bath whereby to minimize contact of air with the electrode at the bath surface.

5. A construction according to claim 4 in which each electrode includes abutment means adapted to support the tile means.

6. A construction according to claim 4 in which the hot legs of the pair of electrodes are offset toward each other from the intermediate portions whereby to provide tile means supporting shoulders.

7. A construction according to claim 4 in which the intermediate portions connect with vertical surfaces of the hot legs, and in which the upper end surfaces of the hot legs are horizontally disposed whereby to provide tile means supporting surfaces.

8. In an electric salt bath furnace, an upwardly open pot, a plurality of removable electrodes each of which comprises, a hot leg positioned in the pot below the normal level of the salt bath, a cold leg above the level of the bath, and an intermediate portion interconnecting the hot leg and cold leg and sloping outwardly and upwardly from the hot leg to the cold leg, the pot wall being constructed and arranged to extend above the upper ends of the hot legs and to provide for surface contact between the pot wall and the undersides of the sloping intermediate portions.

9. A construction according to claim 8 and further including tile means separate from the pot wall but cooperating therewith to form a plurality of passages, the walls of each passage closely surrounding the intermediate portion of an electrode.

10. In an electric salt bath furnace, an upwardly open pot, a pair of removable electrodes each of which comprises, a hot leg positioned in the pot below the normal level of the salt bath, a cold leg above the level of the bath, and in intermediate portion interconnecting the hot leg and cold leg and sloping outwardly and upwardly from the hot leg to the cold leg, the pot wall being arranged to extend above the upper ends of the hot legs and having a sloping surface of sufficient extent to provide for surface contact between the pot wall and the undersides of the intermediate portions of both electrodes, and tile means separate from the pot wall but cooperating therewith to form two passages, the walls of which closely surround the intermediate portions of the two electrodes respectively, said tile means including a first member adapted to fit between the intermediate portions of the electrodes against the sloping surface of the pot wall and a second member adapted to overlie the first member and the intermediate portions of the electrodes.

11. A construction according to claim 10 in which a hot leg is offset from the associated intermediate portion of the electrode toward the other hot leg, in which the offset provides a shoulder against which the first member rests, and in which the second member rests on an end surface of an electrode hot leg.

12. In an electric salt bath furnace, an upwardly open pot generally rectangular in plan, three removable electrodes mounted in a group at one end of the furnace, each electrode comprising a generally vertical hot leg positioned in the pot below the normal level of the salt bath, a generally horizontal cold leg positioned above and extending outwardly beyond the furnace wall, and an intermediate portion interconnecting said hot leg and cold leg and sloping outwardly and upwardly from the upper end of the hot leg to the inner end of the cold leg, the electrode hot legs being arranged in parallel spaced relation with one hot leg adjacent the end wall of the pot and the other two hot legs adjacent the side walls of the pot respectively, the pot walls being chamfered to conform to the bottom surface of the intermediate portion of each electrode, and tile means cooperating with the chamfer surfaces of the pot walls to closely surround the intermediate portion of each electrode at the point where it emerges from the salt bath whereby to minimize contact of air with the electrode at the bath surface.

13. For use with an electric salt bath furnace, a removable electrode comprising, a hot leg adapted to be mounted in the furnace below the normal level of the salt bath, a cold leg adapted to be mounted outside the furnace and above the normal level of the salt bath, and an intermediate portion interconnecting the hot and cold legs, and tile means closely surrounding the intermediate portion at the point where it emerges from the salt bath whereby to minimize contact of air with the electrode at the bath surface, said tile means being of multi-part built-up construction and including separately formed block means, said block means being separately removable from the rest of the tile means, the block means and electrode being removable from the furnace without disturbing the furnace wall, the parts of the tile means being susceptible to assembly with and disassembly from the electrode, whereby to provide for ease of removal and replacement of electrodes and block means.

14. For use with an electric salt bath furnace, a removable electrode comprising, a hot leg adapted to be mounted in the furnace below the normal level of the salt bath, a cold leg adapted to be mounted outside the furnace and above the normal level of the salt bath, and an intermediate portion interconnecting the hot and cold legs, said intermediate portion having a surface lying closely against a surface of the furnace wall when the electrode is mounted in the furnace, and tile means associated and cooperating with the furnace wall to closely surround the intermediate portion at the point where it emerges from the salt bath, said tile means being of multi-part built-up construction and including block means formed separate from the furnace wall, said block means being separately removable from the rest of the tile means, the block means and electrode being removable from the furnace without disturbing the furnace wall, the parts of the tile means being susceptible to assembly with and disassembly from the electrode, whereby to provide for ease of removal and replacement of electrodes and block means.

References Cited in the file of this patent

UNITED STATES PATENTS

| | | |
|---|---|---|
| 2,089,690 | Cornelius | Aug. 10, 1937 |
| 2,234,476 | Jessop | Mar. 11, 1941 |
| 2,419,383 | Ames | Apr. 22, 1947 |